C. G. GRONQUIST.
TIRE CARRIER.
APPLICATION FILED OCT. 9, 1918.
1,390,204.
Patented Sept. 6, 1921.
4 SHEETS—SHEET 3.
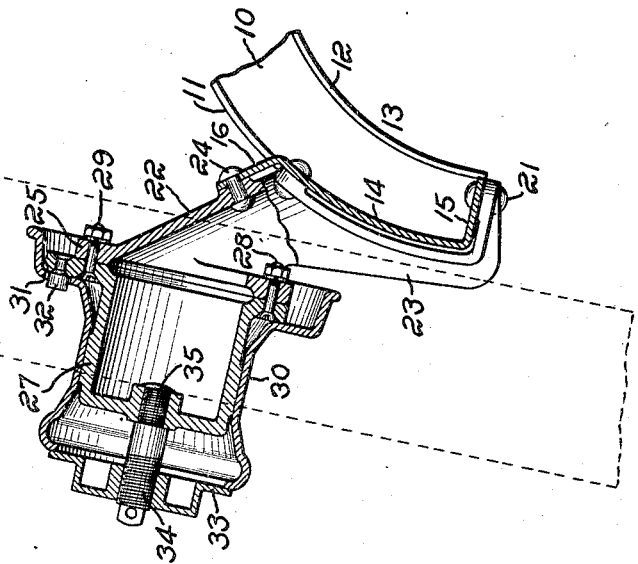
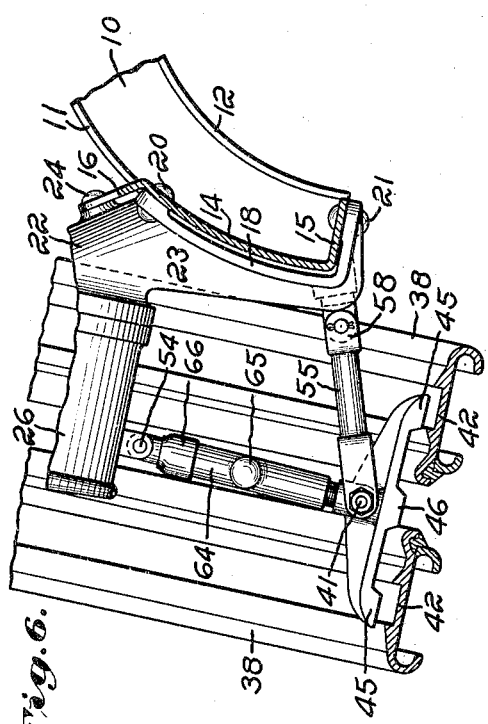
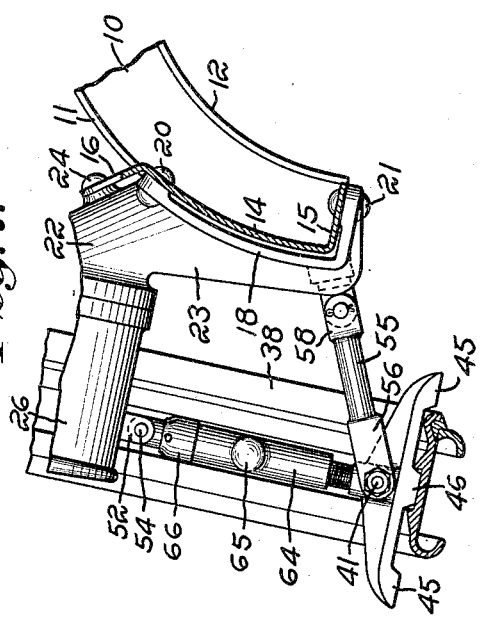
Inventor:
Carl Gustave Gronquist,

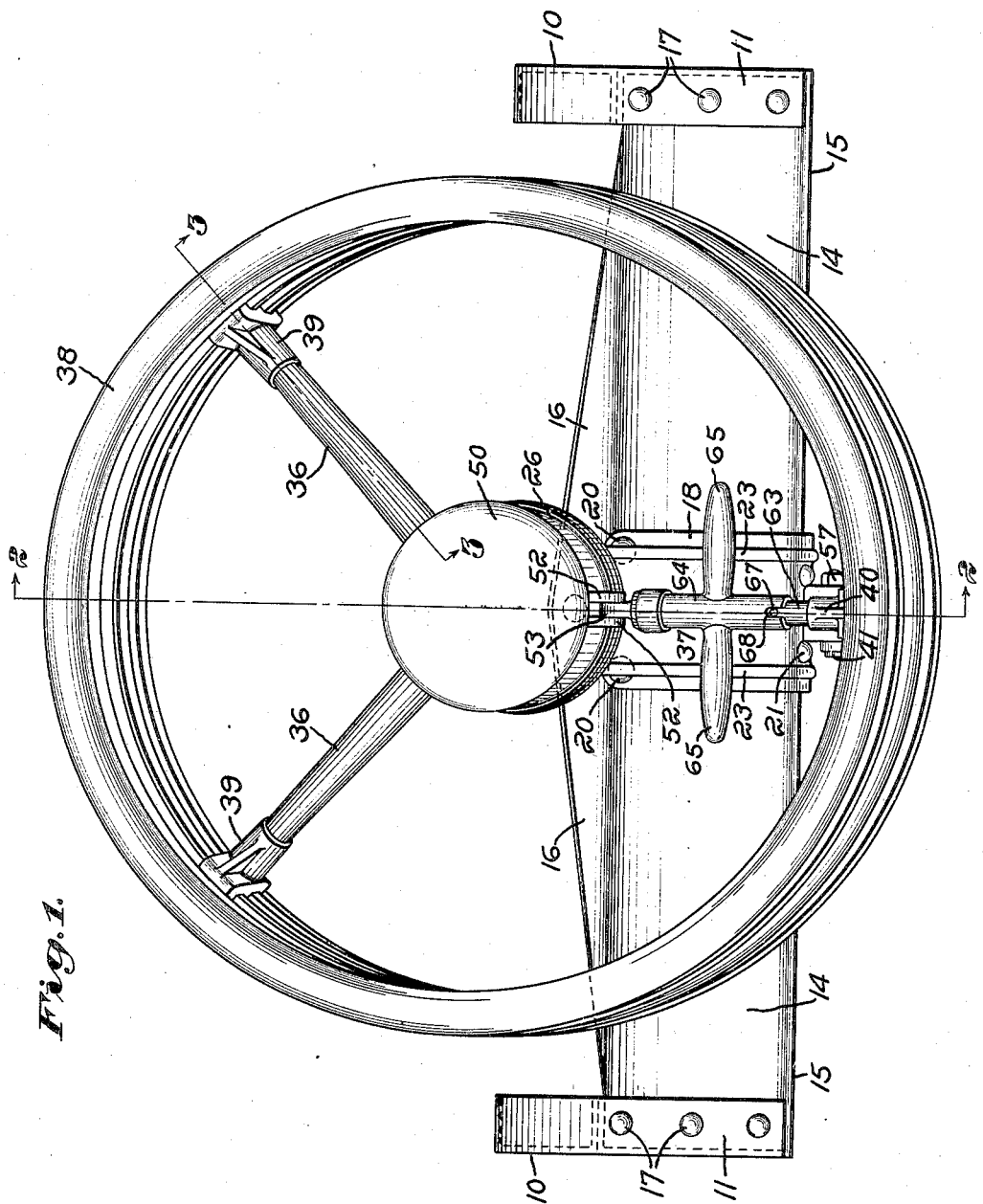

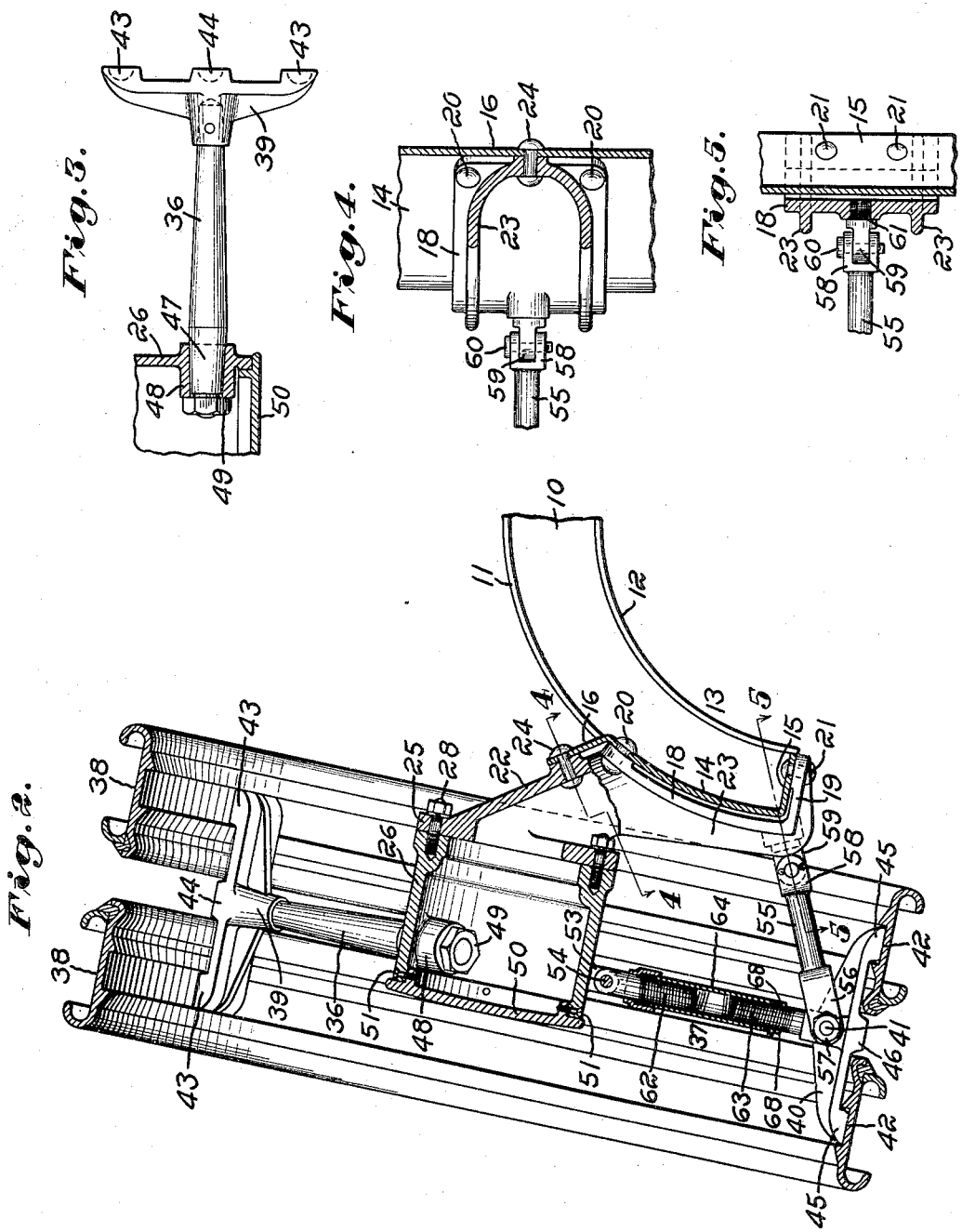

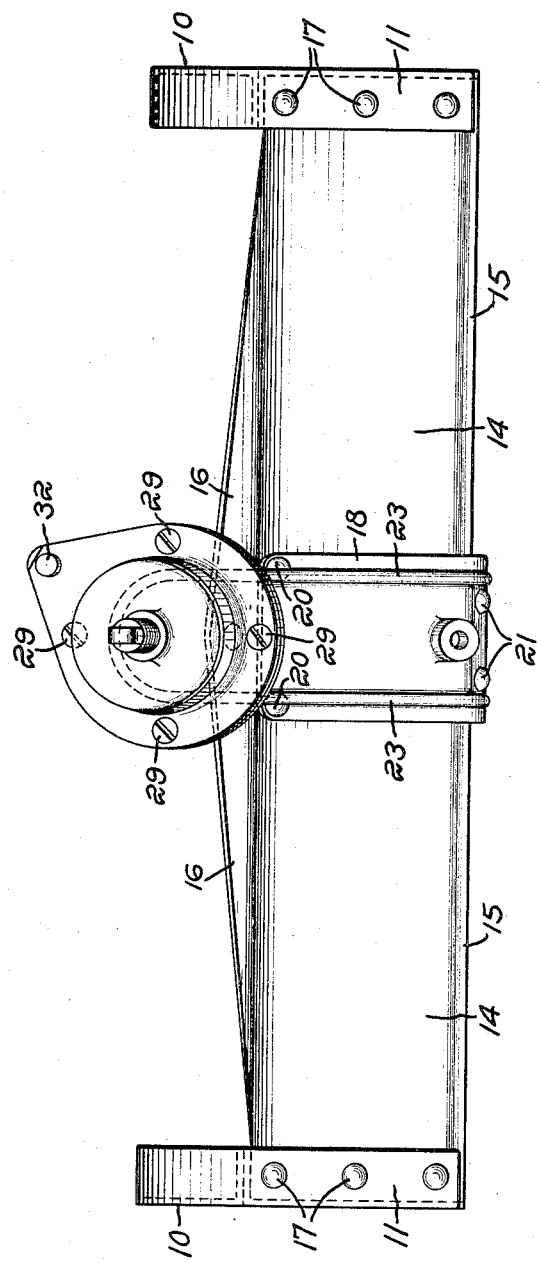

UNITED STATES PATENT OFFICE.

CARL GUSTAVE GRONQUIST, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

TIRE-CARRIER.

1,390,204.   Specification of Letters Patent.   Patented Sept. 6, 1921.

Application filed October 9, 1918. Serial No. 257,428.

*To all whom it may concern:*

Be it known that I, CARL GUSTAVE GRONQUIST, a subject of the King of Sweden, who have declared my intention of becoming a citizen of the United States, and a resident of Bridgeport, county of Fairfield, and State of Connecticut, have invented an Improvement in Tire-Carriers, of which the following description, in connection with the accompanying drawings, is a specification, like characters on the drawings representing like parts.

This invention relates to carriers for spare tires, rims and wheels, and is more especially concerned with a carrier having provision for converting the same at will to receive demountable wheels or rims.

My invention will be best understood by reference to the following description, when taken in connection with the accompanying drawings of one specific embodiment thereof, while its scope will be more particularly pointed out in the appended claims.

In the drawings:

Figure 1 is a rear elevation of a motor vehicle frame equipped with a carrier embodying my invention, showing the same as it appears when arranged for carrying rims;

Fig. 2 is a sectional view on line 2—2 of Fig. 1;

Fig. 3 is a sectional view on line 3—3 of Fig. 1;

Fig. 4 is a sectional view on line 4—4 of Fig. 2;

Fig. 5 is a sectional view on line 5—5 of Fig. 2;

Fig. 6 is a sectional view similar to Fig. 2, but showing the carrier contracted so that the rims may be removed;

Fig. 7 is a sectional view similar to Fig. 2, but showing the carrier with a single rim mounted thereon;

Fig. 8 is a vertical sectional view of the carrier as arranged for carrying demountable wheels; and Fig. 9 is a rear elevation of the carrier, arranged as in Fig. 8.

Referring to the drawings, and to the embodiment of my invention which is illustrated therein, I have shown for purposes of exemplification a portion of a motor vehicle frame comprising a pair of longitudinal channel member 10 having upper and lower inwardly facing flanges 11 and 12. Herein the members 10 have downwardly extending rear terminal portions 13, which in practice may serve for the attachment of usual springs, not shown. Connecting the longitudinal members is a transverse member, which in the present embodiment of my invention comprises a web 14, a lower flange 15 and an upper flange 16. The web 14 connects the upper flanges 11 of the channel members 10, and preferably the flanges 11 and web 14 are arranged in overlapping relationship. Herein, the flanges 11 overlie the web 14, as clearly shown in Fig. 1. The web 14 may be secured to the flanges 11 in any suitable manner, as by means of rivets 17. Preferably, the flange 15 of the transverse member extends transversely of and connects the upper and lower flanges 11 and 12 of the longitudinal members 10. Thus it will be seen that the transverse member forms an exceptionally rigid connection between the side members and gives a neat, finished appearance to the rear end of the frame.

Mounted on the transverse member is a bracket, herein having a base comprising a web 18 and flange 19, which may be secured to the transverse member, as by rivets 20 and 21 extending through the web 14 and flange 15, respectively, as best shown in Fig. 2. The bracket has a rearwardly and preferably upwardly extending arm 22, which is preferably hollow, and herein is channel-shaped in cross section, as best shown in Fig. 4, it being provided with two flanges or ribs 23, which may be and are herein extended to form reinforcements for the flange 19, as best shown at the lower portion of Fig. 2. Great strength and rigidity is obtained by securing the arm 22 to the flange 16, as by means of a rivet 24, clearly shown in Figs. 2 and 4.

The arm 22 terminates at its upper rear end in a suitable hub support 25, the latter being herein in the form of an annular flange. To this flange may be secured an appropriate hub or boss, which may be employed to serve as a support for demountable wheels or rims by the provision of suitable interchangeable parts. In the present example, I have provided a hub or boss 26 for supporting rims, and a hub or boss 27 for supporting demountable wheels.

I preferably also provide interchangeable fastening means for securing the bosses or hubs to the hub support, and in the present example have shown a plurality of studs 28 in Fig. 2, for one hub or boss, and in Fig. 8, a set of bolts 29 for the other hub or boss, there being provided suitable registering holes to receive them. When the carrier is used for demountable wheels, as shown in Figs. 8 and 9, the hub or boss 27 snugly fits into a wheel hub 30, herein of a well-known type commonly forming a part of a wire wheel, the remainder of which it is unnecessary to show or describe, since the same is well known to those skilled in the art. The wheel hub is provided with a usual perforation 31 to receive a projecting pin or lug 32, which positions the wheel hub and prevents the same from turning. The wheel hub is herein held in place by a suitable nut 33, threaded onto a stud 34, the latter being secured to the hub or boss 27, as by screwing the same into the latter and riveting over its inner end, as at 35.

Referring again to the hub or boss 26, which, as before stated, is used to support rims, I may provide any suitable number of radiating arms or spokes, having terminal abutments for engaging the internal circumferential surfaces of the annular body to be supported, herein a rim or rims. In the present embodiment, I have provided two rigid radial arms 36, and a radially extensible arm 37. These arms may be provided with any suitable abutments for engagement with a rim or rims 38. In the present example, I have shown abutments having provision for receiving two rims side by side, as shown in Fig. 2, or a single centrally disposed rim, as shown in Fig. 7. To this end, I have herein provided the arms 36 with terminal abutments 39 and the arm 37 with a similar terminal abutment 40. Preferably, the abutments 39 are rigidly mounted on their respective arms, but the abutment 40 is preferably centrally pivoted on the arm 37, as by a pivot 41, whereby such abutment serves as an equalizer to distribute the pressure equally when two rims are mounted on the carrier, as shown in Fig. 2. When a single arm is carried, as in Fig. 7, the rim is centrally located in line with the pivot of the abutment, and hence the latter has no tendency to rock about its axis.

There are in the market many different kinds of rims, which may be mounted on my carrier by simply making the rim-engaging abutments of suitable form to receive the rim or rims which they are to hold. In the present example, I have shown a well-known commercial rim 38 provided with an internal circumferential groove 42. This groove forms a convenient channel to receive a corresponding part of the tire carrier, and to this end I have provided each of the abutments 39 with two outer lugs 43, and an intermediate lug 44, and have provided the abutment 40 with similar lugs 45 and 46. When two rims are carried, as in Fig. 2, the lugs 43 and 45 interengage with the grooves 42, whereas when a single rim is carried, as in Fig. 7, the lugs 44 and 46 interengage with the groove of the rim.

Preferably, the hub or boss 26 is hollow, as clearly shown in Fig. 2, and preferably the rigid arms 36 are secured thereto, as by providing said arms with tapered shanks 47, having bosses 48, in which they may be held by nuts 49 threaded onto shanks, as best shown in Fig. 3. In this way, the fastening means are concealed, yet readily accessible. Access to the interior of the hub 26 may be gained by providing a removable cover plate 50 fitted into the hub and secured in place by suitable means, herein screws 51 shown in Fig. 2.

The radially extensible arm 37 may be and is herein pivoted to the hub 26, and to that end, the latter is herein provided with a pair of ears 52 best shown in Fig. 1, to receive an ear 53 on said arm, and through these ears a suitable pivot 54 extends. When the arm 37 is extensible, as in the present example, I have provided a suitable brace for the same, and herein I employ for this purpose a link 55 pivotally connected at one end to the arm, and at its other end to a suitable fixed support. One convenient way of pivoting the link to the arm is by providing said link with a clevis or fork 56, to receive the abutment 40, and in such case, the pivot 41 is extended through the sides of the clevis, and is provided with a nut 57 to hold the same in place. Preferably, the other end of the link is also provided with a similar clevis or fork 58, to receive an ear 59 best shown in Figs. 4 and 5, to which the link may be pivoted, as by a clevis pin 60. The ear 59 is herein formed as a part of a stud 61, screwed into the web 18 of the supporting bracket, preferably at a point near the bottom of the latter, so that the arm 37 is well braced, as will be evident from an inspection of Fig. 2.

Any suitable means of adjustment may be provided for the radially extensible arm 37, but in the present embodiment, the latter comprises two screws 62 and 63, and a nut 64 having right and left screw-threaded engagement therewith. By turning the nut in one direction or the other, the arm 37 may be radially elongated or contracted, thereby to move the abutment 40 radially into or out of engagement with the rim or rims. Preferably, the nut 64 is provided with one or more, herein a pair of handles 65, which may be grasped to turn the nut without the aid of a wrench. For the protection of the thread of the screw 62, I have herein provided a guard in the form of a sleeve 66 secured to the upper portion of the screw, and having a skirt depending about the upper end of the nut 64, provision being made to allow the latter to move vertically to the necessary extent without interference, as will be evident from an inspection of Fig. 2.

Preferably the carrier has suitable means to receive a lock to prevent unauthorized persons from removing the rims and tires therefrom, and to that end, I have herein provided the screw 63 with a hole 67 and the nut 64 with a pair of slots 68, which may be caused to register therewith, as shown in Fig. 1. When the hole is in registration with these slots, the hasp of a padlock may be inserted, and the nut 64 thereby locked against rotation.

When it is desired to convert the carrier from a rim-holder to a demountable wheel-holder, this may be done very quickly and conveniently by simply removing the studs 28 and disconnecting the link 55, thus permitting the removal of the hub 26 and the parts which it carries. The other hub 27 may then be substituted, and the bolts 29 put in place, as shown in Fig. 8. The convenience of this interchangeability will be readily appreciated.

Having thus described one embodiment of my invention, what I claim and desire by Letters Patent to secure is:

1. In a holder for annular bodies, the combination of a plurality of radiating arms having terminal abutments for engaging the internal circumferential surface of the annular body, one of said arms comprising screw and nut means for radially extending the same, and a link pivoted at one end to such arm and at its other end to a suitable fixed support.

2. In a holder for annular bodies, the combination of a plurality of radiating arms having terminal abutments for engaging the internal circumferential surface of the annular body, one of said arms being pivoted and radially adjustable, and a link pivotally connected at one end to such arm and at its other end to a fixed support.

3. In a holder for annular bodies, the combination of a plurality of radiating arms having terminal abutments for engaging the internal circumferential surface of the annular body, one of said arms being pivoted and comprising a right and left-hand screw-threaded means for radially adjusting the same, and a link pivotally connected at one end to such arm and at its other end to a fixed support.

4. In a holder for annular bodies, the combination of a plurality of radiating arms having terminal abutments for engaging the internal circumferential surface of the annular body, one of said arms being pivoted and having its abutment pivoted thereto and having radial adjusting means, and a swinging brace for such arm.

5. In a holder for annular bodies, the combination of a hub, a plurality of arms radiating from said hub, one of said arms being radially extensible and being pivoted to said hub to swing lengthwise of the axis thereof, and a pivoted brace for said pivoted arm.

6. In a holder for annular bodies, the combination of a hub, a plurality of arms radiating from said hub having terminal abutments for engaging the internal circumferential surface of the annular body, one of said arms comprising a screw and nut for radially extending the same, and being pivoted to said hub, and a pivoted brace for said pivoted arm.

7. In a holder for annular bodies, the combination of a support, a hub carried thereby, a plurality of arms radiating from said hub having terminal abutments for engaging the internal circumferential surface of the annular body, one of said arms being radially extensible, and a brace connecting said radially extensible arm to said support.

8. In a holder for annular bodies, the combination of a hollow support, a hollow hub carried thereby, and a plurality of arms radiating from said hub, one of said arms being radially extensible and the remaining arm or arms being rigidly secured to and non-extensible with reference to said hub.

9. In a holder for annular bodies, the combination of a hollow support, a hollow hub carried thereby, and a plurality of arms radiating from said hub, one of said arms being radially extensible and the remaining arm or arms being rigid and having fastening means within said hollow hub.

10. In a holder for annular bodies, the combination of a hollow support, a hollow hub secured at one end to said support, a removable cover-plate for the other end of said hub, and a plurality of arms radiating from said hub and having fastening means within said hub.

11. In a vehicle, the combination of a frame comprising a pair of longitudinal, channel members having upper and lower, inwardly-facing flanges; a transverse member having a web having lap-jointed connection with flanges of each of said channel members; a bracket having a base secured to said web, and an arm extending rearwardly therefrom and terminating in a hub-support; a hub; and means to secure said hub to said hub-support.

12. In a vehicle, the combination of a frame comprising a pair of longitudinal, channel members having upper and lower, inwardly-facing flanges; a transverse member having a web having lap-jointed connection with flanges of each of said channel members; a bracket having a base secured to said web, and an arm extending rearwardly therefrom and provided with a hub-supporting annulus; a hub; and means to secure said hub to said annulus.

13. In a vehicle, the combination of a frame comprising a pair of longitudinal, channel members having upper and lower, inwardly-facing flanges; a transverse member having a web having lap-jointed connection with flanges of each of said channel members; a bracket having a base secured to said web, and an arm extending rearwardly therefrom and provided with a hub-supporting flange; a hub; and fastening means connecting said hub and hub-supporting flange.

14. In a vehicle, the combination of a frame comprising a pair of longitudinal, channel members having upper and lower, inwardly-facing flanges; a transverse member having a web having lap-jointed connection with flanges of each of said channel members; a bracket having a base secured to said web, and a hollow arm extending rearwardly therefrom and terminating in a hub-support; a hub; and means to secure said hub to said hub-support.

15. In a vehicle, the combination of a frame comprising a pair of longitudinal, channel members having upper and lower, inwardly-facing flanges; a transverse member having a web having lap-jointed connection with flanges of each of said channel members; a bracket having a base secured to said web, and a channel arm extending rearwardly therefrom and terminating in a hub-support; a hub; and means to secure said hub to said hub-support.

16. In a vehicle, the combination of a frame comprising a pair of longitudinal, channel members having upper and lower, inwardly-facing flanges; a transverse member having a web having lap-jointed connection with flanges of each of said channel members; a bracket having a base secured to said web; a hub-support and a pair of ribs connecting said base to said hub-support; a hub; and means to secure said hub to said hub-support;

17. In a vehicle, the combination of a frame comprising a pair of longitudinal, channel members having upper and lower, inwardly-facing flanges, said members having downwardly-extending, rear, terminal portions; a transverse member having a web having lap-jointed connection with said upper flanges, a lower flange extending transversely of and connecting said upper and lower flanges, and an upper flange extending transversely of and upwardly beyond said upper flange; a bracket having a base comprising a web secured to the web of said transverse member, a flange secured to the lower flange of said transverse member, a channel arm secured to the upper flange of said transverse member, and a hub-support; a hub; and means to secure said hub to said hub-support.

18. In a vehicle, the combination of a frame comprising a pair of longitudinal, channel members having upper and lower, inwardly-facing flanges, said members having downwardly-extending, rear, terminal portions; a transverse member having a web having lap-jointed connection with said upper flanges, a lower flange extending transversely of and connecting said upper and lower flanges, and an upper flange extending transversely of and upwardly beyond said upper flange; a bracket having a base comprising a web secured to the web of said transverse member, a flange secured to the lower flange of said transverse member, a channel arm secured to the upper flange of said transverse member, and a hub-supporting flange; a hub; and means to secure said hub to said hub-supporting flange.

19. In a vehicle, the combination of a frame comprising a pair of longitudinal, channel members having upper and lower, inwardly-facing flanges, said members having downwardly-extending, rear, terminal portions; a transverse member having a web having lap-jointed connection with said upper flanges, a lower flange extending transversely of and connecting said upper and lower flanges, and an upper flange extending transversely of and upwardly beyond said upper flange; a bracket having a base comprising a web secured to the web of said transverse member, a flange secured to the lower flange of said transverse member, a channel arm secured to the upper flange of said transverse member, and an annular, hub-supporting flange; a hub having an annular portion fitting said hub-supporting flange; and means to secure said hub to said hub-supporting flange.

20. In a vehicle, the combination of a frame comprising a pair of longitudinal, channel members having upper and lower, inwardly-facing flanges, said members having downwardly-extending, rear, terminal portions; a transverse member having a web having lap-jointed connection with said upper flanges, a lower flange extending transversely of and connecting said upper and lower flanges, and an upper flange extending transversely of and upwardly beyond said upper flange; a bracket having a base comprising a web secured to the web of said transverse member, a flange secured to the lower flange of said transverse member, a channel arm secured to the upper flange of said transverse member, and an annular, hub-supporting flange; a hub having an annular portion fitting said flange; and fastening means extending from said hub-supporting flange into said annular portion.

21. In a vehicle, the combination of a frame comprising a pair of longitudinal, channel members having upper and lower, inwardly-facing flanges, said members having downwardly-extending, rear, terminal portions; a transverse member having a web having lap-jointed connection with said upper flanges, a lower flange extending transversely of and connecting said upper and lower flanges, and an upper flange extending transversely of and upwardly beyond said upper flange; a bracket having a base comprising a web secured to the web of said transverse member, a flange secured to the lower flange of said transverse member, a rearwardly projecting arm secured to the upper flange of said transverse member and provided with a pair of rearwardly facing flanges and a hub-support; a hub; and means to secure said hub to said hub-support.

In testimony whereof I have signed my name to this specification.

CARL GUSTAVE GRONQUIST.